US012731990B2

(12) United States Patent
Ding et al.

(10) Patent No.: US 12,731,990 B2
(45) Date of Patent: Sep. 8, 2026

(54) UTILITY POLE HAZARDOUS EVENT LOCALIZATION

(71) Applicant: NEC Laboratories America, Inc., Princeton, NJ (US)

(72) Inventors: Yangmin Ding, East Brunswick, NJ (US); Yuanda Xu, Jersey City, NJ (US); Yue Tian, Princeton, NJ (US); Sarper Ozharar, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 631 days.

(21) Appl. No.: 17/717,112

(22) Filed: Apr. 10, 2022

(65) Prior Publication Data

US 2022/0329068 A1 Oct. 13, 2022

Related U.S. Application Data

(60) Provisional application No. 63/173,532, filed on Apr. 12, 2021.

(51) Int. Cl.

| | |
|---|---|
| ***H02J 3/001*** | (2026.01) |
| ***G01D 5/353*** | (2006.01) |
| ***G01H 9/00*** | (2006.01) |

(52) U.S. Cl.

CPC .......... *H02J 3/001* (2020.01); *G01D 5/35338* (2013.01); *G01H 9/004* (2013.01)

(58) Field of Classification Search

CPC .. H02J 3/00125; H02J 3/001; G01D 5/35358; G01D 5/35338; G01D 5/35374; G01H 9/004

See application file for complete search history.

(56) References Cited

U.S. PATENT DOCUMENTS

| | | | | |
|---|---|---|---|---|
| 9,841,315 B2 * | 12/2017 | Taverner | ............ | G02B 6/02342 |
| 2009/0169309 A1 * | 7/2009 | Kwon | ..................... | E02D 27/42 405/232 |

(Continued)

FOREIGN PATENT DOCUMENTS

| | | | | |
|---|---|---|---|---|
| JP | 2008067467 A * | 3/2008 | ............. | Y02B 90/20 |
| WO | WO-2020044648 A1 * | 3/2020 | ............. | G01D 5/353 |

OTHER PUBLICATIONS

English Translation for WO-2020044648-A1 (Year: 2020).*

(Continued)

*Primary Examiner* — Tarun Sinha

(74) *Attorney, Agent, or Firm* — Vincent Duffy

(57) ABSTRACT

Distributed fiber optic sensing (DFOS) and artificial intelligence (AI) systems and methods for performing utility pole hazardous event localization that advantageously identify a utility pole that has undergone a hazardous event such as being struck by an automobile or other detectable impact. Systems and methods according to aspects of the present disclosure employ machine learning methodologies to uniquely identify an affected utility pole from a plurality of poles. Our systems and methods collect data using DFOS techniques in telecommunication fiber optic cable and use an AI engine to analyze the data collected for the event identification. The AI engine recognizes different vibration patterns when an event happens and advantageously localizes the event to a specific pole and location on the pole with high accuracy. The AI engine enables analyses of events in real-time with greater than 90% accuracy.

10 Claims, 4 Drawing Sheets

(56) References Cited

U.S. PATENT DOCUMENTS

| | | | | |
|---|---|---|---|---|
| 2011/0185815 | A1* | 8/2011 | McCann | G01H 9/004 73/649 |
| 2016/0281494 | A1* | 9/2016 | Shirdel | E21B 33/12 |
| 2019/0113561 | A1* | 4/2019 | Yogeeswaran | H04B 10/071 |
| 2021/0172767 | A1* | 6/2021 | Yoda | G01H 9/004 |

OTHER PUBLICATIONS

Ajo-Franklin JB, Dou S, Lindsey NJ, Monga I, Tracy C, Robertson M, Rodriguez Tribaldos V, Ulrich C, Freifeld B, Daley T, Li X. Distributed Acoustic Sensing Using Dark Fiber for Near-Surface Characterization and Broadband Seismic Event Detection. Sci Rep. Feb. 4, 2019;9(1):1328 (Year: 2019).*

* cited by examiner

UTILITY POLE HAZARDOUS EVENT LOCALIZATION

CROSS REFERENCE TO RELATED APPLCIATIONS

This application claims the benefit of U.S. Provisional Patent Application Ser. No. 63/173,532 filed 12 Apr. 2021 the entire contents of each is incorporated by reference as if set forth at length herein.

TECHNICAL FIELD

This disclosure relates generally to distributed fiber optic sensing (DFOS) systems methods and structures. More particularly, it describes DFOS and artificial intelligence (AI) systems and methods for locating hazardous events occurring to utility poles that suspend/support aerial wires/cables.

BACKGROUND

As those skilled in the art will readily appreciate, distributed fiber optic sensing systems and methods have shown to be of great utility and provide a range of useful services such as sensing various physical parameters including temperature, vibration, strain, etc., thereby enabling a new era of infrastructure monitoring.

Utility poles are well known and recognizable in contemporary society and are typically associated with suspending telecommunications, electrical power, and other infrastructure facilities thereby providing an efficient distribution of telecommunications traffic and electrical power. Given their importance to contemporary society, when an anomaly occurs with respect to the telecommunications or electrical facilities a quick identification and reporting of the anomalous condition to an appropriate responder is of critical importance.

SUMMARY

An advance in the art is made according to aspects of the present disclosure directed to DFOS and AI systems and methods for performing utility pole hazardous event localization.

In sharp contrast to the prior art, our inventive systems, and methods according to aspects of the present disclosure advantageously identify a utility pole that has undergone a hazardous event such as being struck by an automobile or other detectable impact. Additionally, systems and methods according to aspects of the present disclosure employ machine learning methodologies to uniquely identify an affected utility pole from a plurality of poles and a location on the affected pole to which the hazardous event struck.

Our inventive approach employs data collected using DFOS with a telecommunication fiber optic cable. An AI engine is employed to analyze the data collected and identify the event(s) and their location on the utility pole. The AI engine analyzes events in real-time with a high accuracy (more than 90%).

BRIEF DESCRIPTION OF THE DRAWING

A more complete understanding of the present disclosure may be realized by reference to the accompanying drawing in which.

Figure 1:
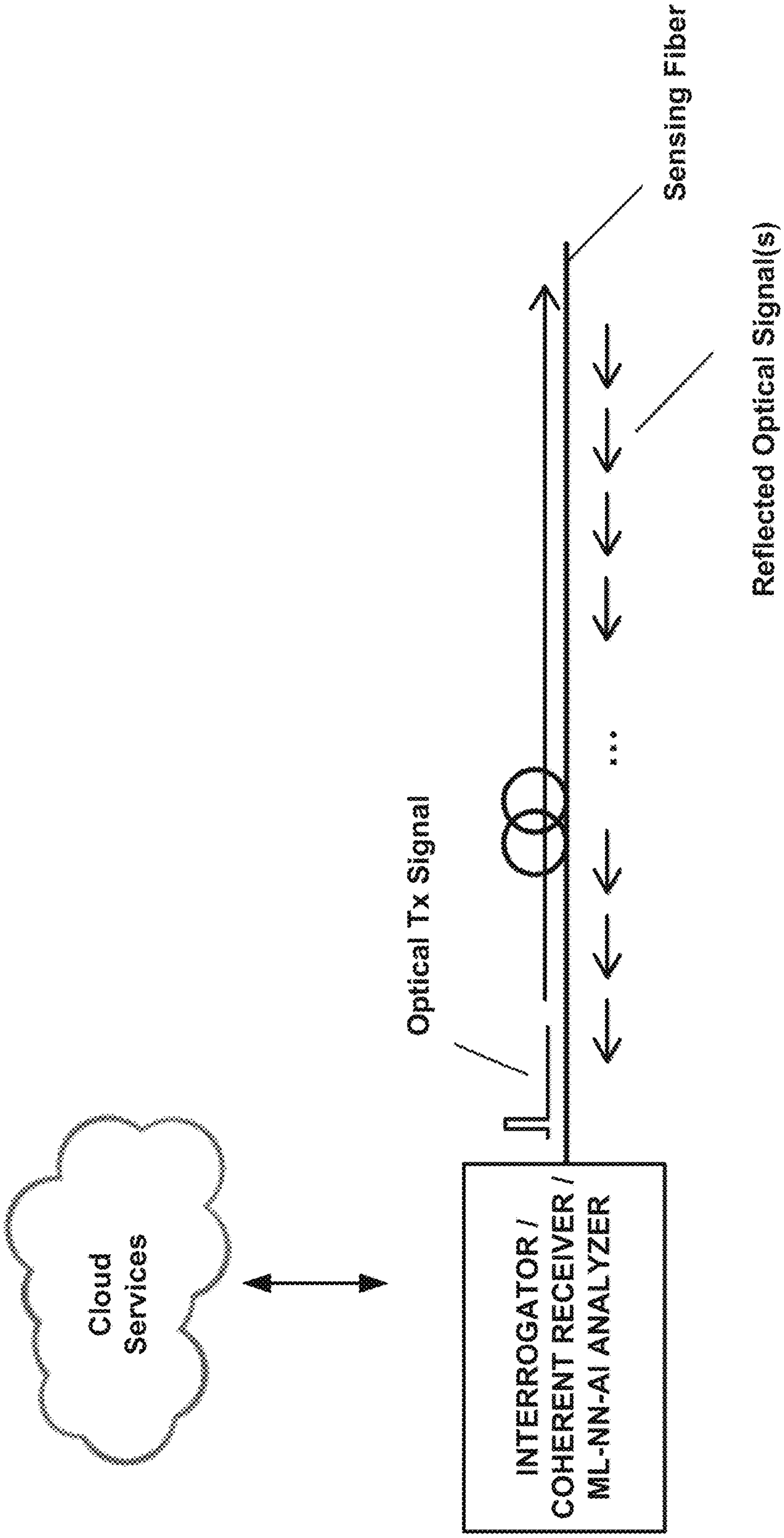
FIG. 1 is a schematic diagram of an illustrative distributed fiber optic sensing system according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Fiber optic sensing measures changes in "backscattering" of light occurring in an optical sensing fiber when the sensing fiber encounters vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

A schematic diagram illustrating the generalized arrangement and operation of a distributed fiber optic sensing system including artificial intelligence analysis and cloud storage/service is shown in FIG. 1. With reference to FIG. 1 one may observe an optical sensing fiber that in turn is connected to an interrogator. As is known, contemporary interrogators are systems that generate an input signal to the fiber and detects/analyzes reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes the interrogator that periodically generates optical pulses (or any coded signal) and injects them into an optical fiber. The injected optical pulse signal is conveyed along the optical fiber.

At locations along the length of the fiber, a small portion of signal is scattered/reflected and conveyed back to the interrogator. The scattered/reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed Acoustic Sensing (DAS)/Distributed Vibrational Sensing (DVS) systems detect vibrations and capture acoustic energy along the length of optical sensing fiber. Advantageously, existing, traffic carrying fiber optic networks may be utilized and turned into a distributed acoustic sensor, capturing real-time data. Classification algorithms may be further used to detect and locate events such as leaks, cable faults, intrusion activities, or other abnormal events including both acoustic and/or vibrational.

Various DAS/DVS technologies are presently used with the most common being based on Coherent Optical Time Domain Reflectometry (C-OTDR). C-OTDR utilizes Rayleigh back-scattering, allowing acoustic frequency signals to be detected over long distances. An interrogator sends a coherent laser pulse along the length of an optical sensor fiber (cable). Scattering sites within the fiber cause the fiber to act as a distributed interferometer with a gauge length like that of the pulse length (e.g. 10 meters). Acoustic disturbance acting on the sensor fiber generates microscopic elongation or compression of the fiber (micro-strain), which causes a change in the phase relation and/or amplitude of the light pulses traversing therein.

Before a next laser pulse is be transmitted, a previous pulse must have had time to travel the full length of the sensing fiber and for its scattering/reflections to return. Hence the maximum pulse rate is determined by the length of the fiber. Therefore, acoustic signals can be measured that vary at frequencies up to the Nyquist frequency, which is typically half of the pulse rate. As higher frequencies are attenuated very quickly, most of the relevant ones to detect and classify events are in the lower of the 2 kHz range.

Figure 2:
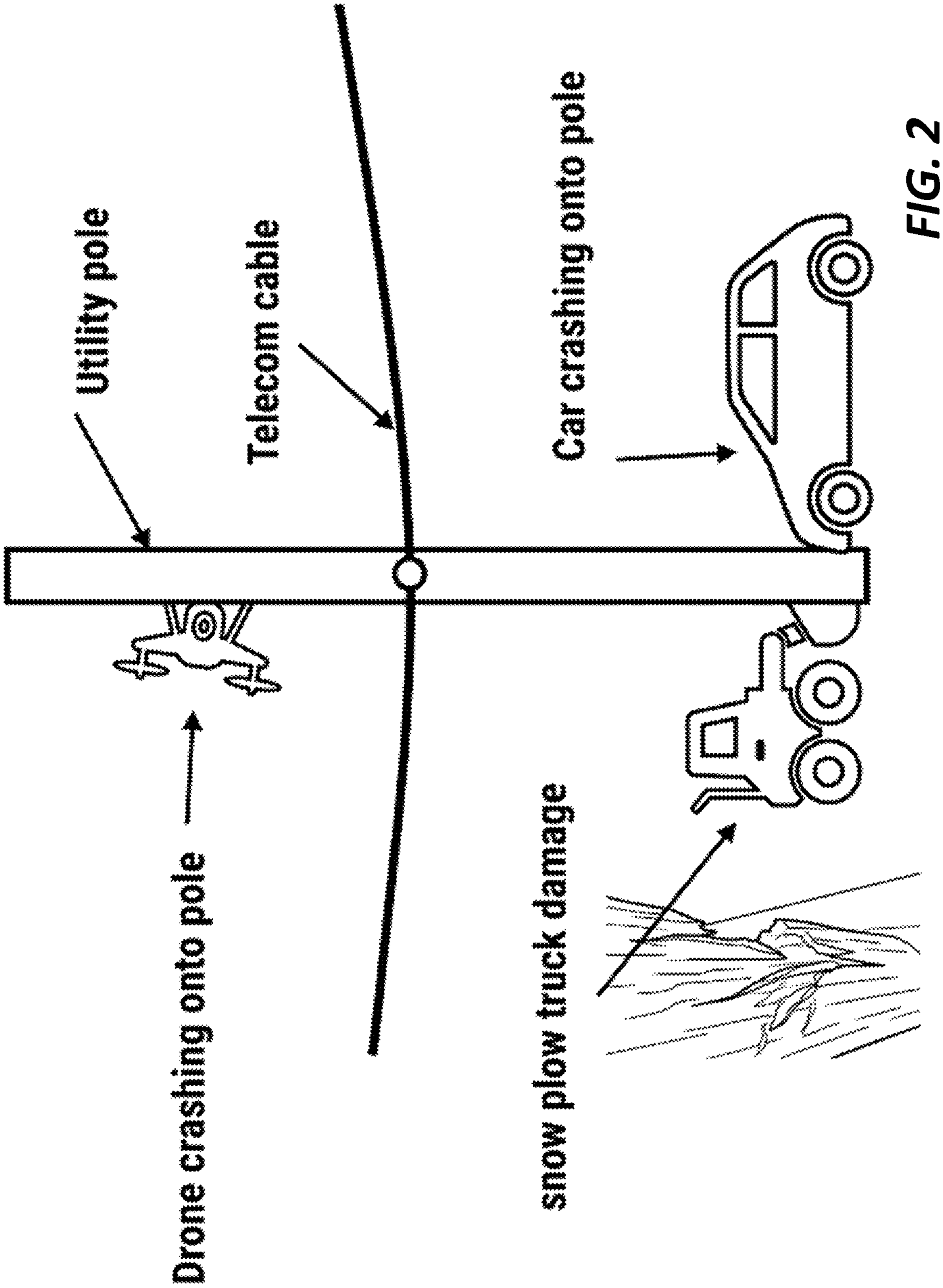
FIG. 2 is a schematic diagram illustrating wires/cables aerially suspended/supported by a utility pole experiencing a hazardous event according to aspects of the present disclosure.

FIG. 2 is a schematic diagram illustrating wires/cables aerially suspended/supported by a utility pole according to aspects of the present disclosure. As may be observed from that figure, utility poles generally include aerial telecommunications cables, which includes telephone and cable TV wires/cables.

Of course, those skilled in the art will readily understand and appreciate that utility poles such as that shown in the figure have been widely used to support wires that bring electricity from a power company to residents and enable the growing network of telephones, televisions, and the interne. Such poles are generally constructed from wood, and their wood material, in turn, provides great flexibility for hardware and cable apparatus replacement. However, such wooden material is also fragile to outside hazardous such as snow plow truck damage during winter season (below the telecom cable), car crashing (below the telecom cable) or drone crashing onto pole (above the telecom cable) as well as tree damage (anywhere on the pole). Those hazardous events occurring on pole can poses different vibration levels to the pole and thus require different level of attention.

As is known, a distributed fiber optic sensing system allows existing telecommunication fiber optic cable to be employed as a distributed sensor to capture responses of the optical cable resulting from mechanical impacts to the pole. However, the current distributed fiber sensing systems are not designed to classify those events (below or above the telecom cable). In this invention, we designed a machine learning algorithm to localize those events based on the vibration data collected from distributed fiber sensing As will be readily understood and appreciated, the above-mentioned wires/cables that are located on (suspended from) a utility pole can be subject to dynamic hazards such as falling tree(s), animal activities, drone/kite flying, automobile accidents, weather, etc., that affect the suspended wires/cables. When such hazards are not properly addressed, serious service interruption(s) and threats to persons/property may result.

As will be further appreciated, when hazards affect wires/cables suspended from utility pole(s), quick identification of affected wires/cables and reporting of an accurate location of the affected pole is extremely important for service preservation/recovery. For utility poles in rural areas, this is even more important since it may be prohibitively time-consuming for a human technician to localize any affected/interrupted poles/wires/cables—section-by-section—without first correctly pinpointing which poles.

Figure 3:
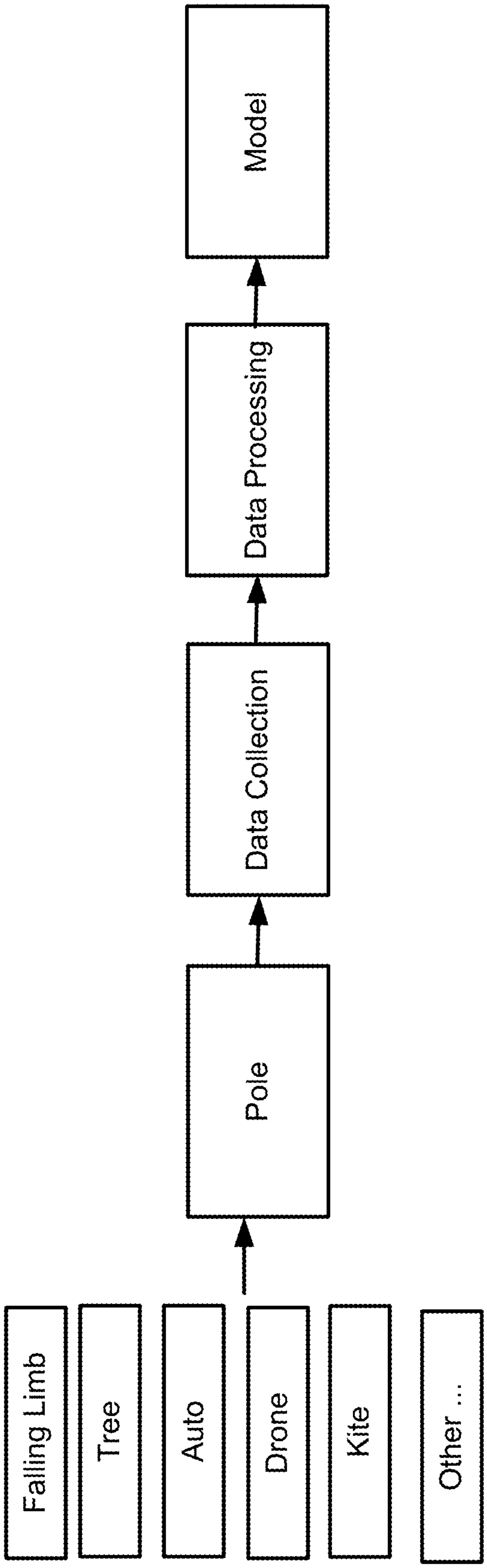
FIG. 3 is a schematic flow diagram illustrating overall utility pole hazardous event determination according to aspects of the present disclosure.

FIG. 3 is a schematic flow diagram illustrating overall utility pole hazardous event determination according to aspects of the present disclosure. As illustratively shown in that figure, mechanical impacts to a utility pole are detected/collected as DFOS signals from operation of the DFOS system. Such collected data is processed and used to create a model which is subsequently employed to analyze/evaluate/predict the nature of impacts made to the pole(s).

We note that our inventive approach collects data using distributed fiber sensing in the telecommunication fiber optic cable. We use an AI engine to analyze data collected for event identification and localization. Advantageously, our AI engine may recognize different vibration patterns even if the event happens at various pole locations with a high accuracy. Our AI engine advantageously enable us to analyze the events that happen in real-time with high accuracy (more than 90%).

As noted, our inventive systems and methods advantageously employ the collection of high-quality data and machine learning models to identify patterns For the data collection process, we connect the distributed fiber sensing interrogator to the aerial optical sensor cable and collect strain signal(s) along a target route that may advantageously include a plurality of utility poles. Data quality check-up, filtering, windowing will are applied to confirm the validity of the raw data. The data is collected using a "hammer test", wherein a mechanical impact is made to the utility poles along the route (i.e., with a hammer) and DFOS data is collected during such testing.

For machine learning models, the process is split into training and testing stages. The data is collected and preprocessed. The training stage uses half of the collected data and the testing stage uses half of the collected data. The model uses 500 hundred estimators for ensemble methods.

The machined learning model is pre-trained and pretested. In total there are 1400 data points and we split into half for training, half for testing. We use tree-based ensemble methods and have 500 hundred estimators. The training accuracy is 100% and the testing accuracy is 91%.

As illustrated in the figure, external events such as falling limbs, trees, kites, etc., may affect or otherwise cause anomaly on suspended wires/cables. When so detected, the pole location may be identified.

Figure 4:
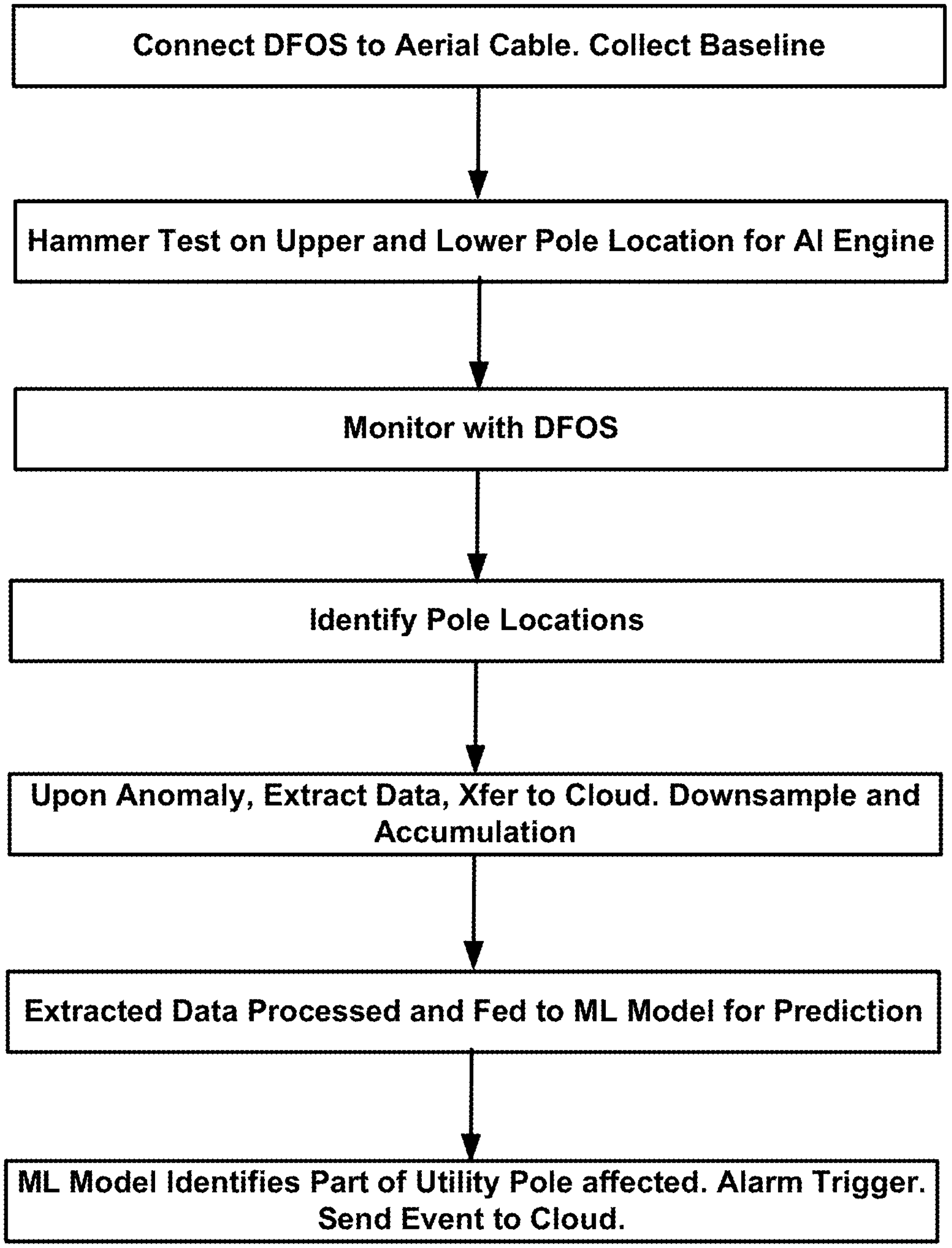
FIG. 4 is a schematic flow diagram illustrating overall process according to aspects of the present disclosure.

FIG. 4 is a schematic flow diagram illustrating specific wire type identification associated with an anomaly for wires/cables aerially suspended from utility poles according to aspects of the present disclosure.

With reference to that figure, it may be observed that at Step 1, a distributed fiber optic sensing interrogator is connected to an aerial optical sensor cable and collecting the strain signal along the target route. Data quality check-up, filtering, windowing will also be applied in this step to confirm the validity of the raw data;

At Step 2 A "hammer test" is on poles to simulate mechanical impact events with the poles. In this step, the vibration signals (DFOS return signals) resulting from the mechanical impacts are collected before, during, and after the mechanical impact events. The hammer test impacts are performed on upper and lower half portions of the utility poles and therefore have different effects on the vibration signals. These hammer test signals provide information for the AI engine to identify subsequent events and their localization with respect to individual pole(s) and location(s) on the pole(s).

At Step 3, the DFOS system and interrogator is connected to the optical sensor fiber route of interest and starts to continuously monitor the route.

At Step 4, the location of each of the plurality of utility poles is identified, which location(s) are subsequently used for mechanical impact event records resulting from anomalous impact events.

At Step 5, when an anomaly occurs, the system automatically extracts the raw data (DFOS vibration signal) at locations along the length of the optical sensor fiber. Simultaneously, vibration datasets are transferred to a cloud storage system. Down-sampling and accumulation operations are performed after data preprocessing which results in a stronger signal pattern.

At Step 6: The extracted raw data (DFOS vibration signals) are processed and fed into a machine learning model for subsequent prediction.

Finally, at Step 7, the machine learning model identifies which part of the utility pole is affected. The system triggers an alarm and sends the event to the cloud base for recording and initiation of any subsequent service dispatch.

At this point, while we have presented this disclosure using some specific examples, those skilled in the art will recognize that our teachings are not so limited. Accordingly, this disclosure should be only limited by the scope of the claims attached hereto.

The invention claimed is:

1. A utility pole hazardous event localization system comprising:

a receiver configured to receive backscattered light containing vibration patterns from an optical fiber located by the utility pole, the vibration patterns indicative of vibrations on the utility pole;

a detector configured to detect where, on the utility pole, and based upon the vibration patterns, a utility pole hazardous event occurs; and an analyzer configured to analyze, based upon the nature of the vibration patterns, a type of impact on the utility pole to determine whether the utility pole hazardous event occurred above or below the optical fiber.

2. The utility pole hazardous event localization system according to claim 1, wherein the detector detects a utility pole hazardous event based on a comparison of the vibration patterns and a trained model, the trained model trained on vibrations indicative of a utility pole hazardous event.

3. The utility pole hazardous event localization system according to claim 1, wherein the detector detects a location of the utility pole hazardous event based the vibration patterns indicative of vibrations on the utility pole.

4. The utility pole hazardous event localization system according to claim 1, wherein the detector detects the utility pole hazardous event resulting from one of snow plow truck damage, car crashing, and drone crashing.

5. The system of claim 1 wherein the optical fiber is an aerial optical fiber suspended from the utility pole and the detector detects whether the hazardous event occurs above or below the aerial optical fiber.

6. A utility pole hazardous event localization method comprising:

receiving backscattered light patterns from an optical fiber located by the utility pole, the backscattered light patterns indicative of a state of the utility pole;

detecting, based upon the backscattered light patterns received, where, on the utility pole, a hazardous event occurs; and analyzing, based upon the nature of the vibration patterns, a type of impact on the utility pole to determine whether the utility pole hazardous event occurred above or below the optical fiber.

7. The method according to claim 6, wherein the detecting comprises comparing vibration pattern with a trained model.

8. The method according to claim 6, further comprising: detecting a location of the utility pole based on the vibration patterns.

9. The method according to claim 6, wherein the detecting a utility pole hazardous event detects a utility pole hazardous event resulting from one of snow plow truck damage, car crashing, and drone crashing.

10. The system of claim 6 wherein the optical fiber is an aerial optical fiber suspended from the utility pole and the detecting determines whether the hazardous event occurs above or below the aerial optical fiber.

* * * * *